(12) United States Patent
Luo

(10) Patent No.: US 11,444,895 B2
(45) Date of Patent: Sep. 13, 2022

(54) SESSION MESSAGE STICKING METHOD AND DEVICE

(71) Applicant: TIANJIN BYTEDANCE TECHNOLOGY CO., LTD., Tianjin (CN)

(72) Inventor: Zhenxing Luo, Beijing (CN)

(73) Assignee: TIANJIN BYTEDANCE TECHNOLOGY CO., LTD., Tianjin (CN)

( * ) Notice: Subject to any disclaimer, the term of this patent is extended or adjusted under 35 U.S.C. 154(b) by 0 days.

(21) Appl. No.: 17/245,278

(22) Filed: Apr. 30, 2021

(65) Prior Publication Data

US 2021/0250311 A1 Aug. 12, 2021

Related U.S. Application Data

(63) Continuation of application No. PCT/CN2019/127993, filed on Dec. 24, 2019.

(30) Foreign Application Priority Data

Dec. 29, 2018 (CN) .......................... 201811635513.4

(51) Int. Cl.
*G06F 3/04817* (2022.01)
*G06F 3/04842* (2022.01)
(Continued)

(52) U.S. Cl.
CPC .......... *H04L 51/04* (2013.01); *G06F 3/04817* (2013.01); *G06F 3/04842* (2013.01);
(Continued)

(58) Field of Classification Search
None
See application file for complete search history.

(56) References Cited

U.S. PATENT DOCUMENTS 8,984,444 B2* 3/2015 O ........................ G06Q 10/107
715/837
10,616,159 B2* 4/2020 Madnani ................. H04L 67/42
(Continued)

FOREIGN PATENT DOCUMENTS

CN 102681847 A 9/2012
CN 102855053 A 1/2013
(Continued)

OTHER PUBLICATIONS http://www.taskmanagementsoft.com/support/faq/how-to-drag-and-drop-email-messages-from-ms-outlook-into-vip-task-manager.php, How to drag and drop email messages from MS Outlook into a VIP Task Manager?, Apr. 30, 2018 (Year: 2018).*
(Continued)

*Primary Examiner* — Henry Orr
(74) *Attorney, Agent, or Firm* — Faegre Drinker Biddle & Reath LLP

(57) ABSTRACT

Disclosed are a method and apparatus for sticking a conversation message on top for processing. The method includes: detecting whether an obtained operation meets a predetermined condition when a client determines that a first conversation in a current conversation list region is in a selected state; and if so, displaying an icon of the first conversation synchronously at a predetermined position in a sticky conversation region. In this method, an icon of a conversation in a conversation list region can be displayed synchronously in a sticky conversation region through an operation meeting a predetermined condition, such that a user can process a message based on the icon in the sticky conversation region. In this way, the processing efficiency can be improved, and by displaying the conversation simultaneously in the conversation list region and the sticky conversation region, flexibility in displaying the conversa- (Continued)

tion can be improved, thereby facilitating the user's operations.

11 Claims, 7 Drawing Sheets

(51) Int. Cl.
*G06F 3/04886* (2022.01)
*H04L 51/216* (2022.01)
*H04L 51/04* (2022.01)
*G06F 3/04845* (2022.01)

(52) U.S. Cl.
CPC ...... *G06F 3/04845* (2013.01); *G06F 3/04886* (2013.01); *H04L 51/216* (2022.05)

(56) References Cited

U.S. PATENT DOCUMENTS

| | | | | |
|---|---|---|---|---|
| 2005/0091314 | A1* | 4/2005 | Blagsvedt | G06F 3/04842 709/204 |
| 2010/0281397 | A1* | 11/2010 | Buchheit | G06F 16/248 715/752 |
| 2012/0278388 | A1* | 11/2012 | Kleinbart | G06Q 10/10 709/204 |
| 2013/0121481 | A1* | 5/2013 | Mikan | H04L 51/10 379/88.14 |
| 2013/0285948 | A1 | 10/2013 | Zhang | |
| 2015/0020023 | A1 | 1/2015 | Wu | |
| 2015/0142897 | A1* | 5/2015 | Alten | H04L 51/36 709/206 |
| 2016/0286002 | A1* | 9/2016 | Marra | H04L 51/16 |
| 2016/0299672 | A1* | 10/2016 | Lindenberg | H04L 65/1069 |
| 2018/0152399 | A1 | 5/2018 | Ma et al. | |
| 2019/0212829 | A1* | 7/2019 | Yang | G06Q 10/109 |

FOREIGN PATENT DOCUMENTS

| | | |
|---|---|---|
| CN | 103309673 A | 9/2013 |
| CN | 104298432 A | 1/2015 |
| CN | 105549844 A | 5/2016 |
| CN | 105553826 A | 5/2016 |
| CN | 105893136 A | 8/2016 |
| CN | 106888236 A | 6/2017 |
| CN | 107800862 A | 3/2018 |
| CN | 107895004 A | 4/2018 |
| CN | 109729004 A | 5/2019 |
| JP | 2015505390 A | 2/2015 |
| KR | 20140063873 A | 5/2014 |
| WO | 2013/159536 A1 | 10/2013 |
| WO | 2014/040434 A1 | 3/2014 |
| WO | 2017/101726 A1 | 6/2017 |
| WO | 2018041094 A1 | 8/2018 |

OTHER PUBLICATIONS

Microsoft Outlook 2016 User Manual published Aug. 1, 2018 pp. 1-121 (Year: 2018).*
International Search Report for International Patent Application No. PCT/CN2019/127993, dated Mar. 2, 2020, 5 pages with English Translation.
Chinese Patent Application No. 201811635513.4, First Office Action and Search Report dated Jan. 9, 2020, 17 pages with English Translation.
Chinese Patent Application No. 201811635513.4, Second Office Action dated Jun. 19, 2020, 15 pages with English Translation.
Chinese Patent Application No. 201811635513.4, Third Office Action dated Oct. 12, 2020, 6 pages with English Translation.
Chinese Patent Application No. 201811635513.4, Rejection Decision dated Feb. 2, 2021, 6 pages with English Translation.
Chinese Patent Application No. 201811635513.4, Reexamination Decision dated Jun. 23, 2021, 2 pages with English Translation.
Chinese Patent Application No. 201811635513.4, Grant Notice dated Aug. 3, 2021, 3 pages with English Translation.
Extended European Search Report dated Jul. 22, 2022 in European Patent Application No. 19904213.6.

* cited by examiner

SESSION MESSAGE STICKING METHOD AND DEVICE

CROSS-REFERENCE TO RELATED APPLICATION

The present disclosure is a continuation of International Application No. PCT/CN2019/127993, filed on Dec. 24, 2019, which claims priority to Chinese Patent Application No. 201811635513.4, titled "METHOD AND APPARATUS FOR STICKING CONVERSATION MESSAGE ON TOP FOR PROCESSING", and filed by Tianjin Bytedance Technology Co., Ltd., on Dec. 29, 2018.

TECHNICAL FIELD

The present disclosure relates to the field of terminal device technologies, and more particularly, to a method and apparatus for sticking a conversation message on top for processing.

BACKGROUND

Instant messaging is a popular way of communication on the Internet, and various instant messaging applications are emerging one after another. For existing instant messaging applications, all conversations with unread messages will be displayed in a conversation list at the same time.

SUMMARY

The present disclosure provides a method and apparatus for sticking a conversation message on top for processing, capable of solving a problem associated with inefficiency in processing unread messages by a user with a method for processing a conversation message in the related art.

According to an embodiment of one aspect of the present disclosure, a method for sticking a conversation message on top for processing is provided. The method includes: detecting whether an obtained operation meets a predetermined condition when a client determines that a first conversation in a current conversation list region is in a selected state; and if so, displaying an icon of the first conversation synchronously at a predetermined position in a sticky conversation region.

With the method for sticking a conversation message on top for processing according to the embodiment of the present disclosure, when a client determines that a first conversation in a current conversation list region is in a selected state, it is detected whether an obtained operation meets a predetermined condition. If so, an icon of the first conversation is displayed synchronously at a predetermined position in a sticky conversation region. In this way, an icon of a conversation in a conversation list region can be displayed synchronously in the sticky conversation region through an operation meeting the predetermined condition, such that a user can process a message based on the icon in the sticky conversation region. In this way, the processing efficiency can be improved, and by displaying the conversation simultaneously in the conversation list region and the sticky conversation region, flexibility in displaying the conversation can be improved, thereby facilitating the user's operations.

According to an embodiment of another aspect of the present disclosure, an apparatus for sticking a conversation message on top for processing is provided. The apparatus includes: a detection module configured to detect whether an obtained operation meets a predetermined condition when a client determines that a first conversation in a current conversation list region is in a selected state; and a first display module configured to display an icon of the first conversation synchronously at a predetermined position in a sticky conversation region when the obtained operation meets the predetermined condition.

With the apparatus for sticking a conversation message on top for processing according to the embodiment of the present disclosure, when a client determines that a first conversation in a current conversation list region is in a selected state, it is detected whether an obtained operation meets a predetermined condition. If so, an icon of the first conversation is displayed synchronously at a predetermined position in a sticky conversation region. In this way, an icon of a conversation in a conversation list region can be displayed synchronously in the sticky conversation region through an operation meeting the predetermined condition, such that a user can process a message based on the icon in the sticky conversation region. In this way, the processing efficiency can be improved, and by displaying the conversation simultaneously in the conversation list region and the sticky conversation region, flexibility in displaying the conversation can be improved, thereby facilitating the user's operations.

According to an embodiment of yet another aspect of the present disclosure, an electronic device is provided. The electronic device includes a processor and a memory. The processor executes a program corresponding to executable program codes stored in the memory by reading the executable program codes, to perform the method for sticking a conversation message on top for processing as described in the above one aspect.

According to an embodiment of still yet another aspect of the present disclosure, a computer-readable storage medium is provided. The computer-readable storage medium has a computer program stored thereon. The program, when executed by a processor, implements the method for sticking a conversation message on top for processing as described in the above one aspect.

Additional aspects and advantages of the present disclosure will be given at least in part in the following description, or become apparent at least in part from the following description, or can be learned from practicing of the present disclosure.

BRIEF DESCRIPTION OF DRAWINGS

In order to clearly illustrate technical solutions of embodiments of the present disclosure, a brief description of drawings used in the embodiments is given below. Obviously, the drawings in the following description are only part embodiments of the present disclosure, and for those skilled in the art, other drawings can be obtained according to these drawings without creative labor.

DESCRIPTION OF EMBODIMENTS

Figure 1:
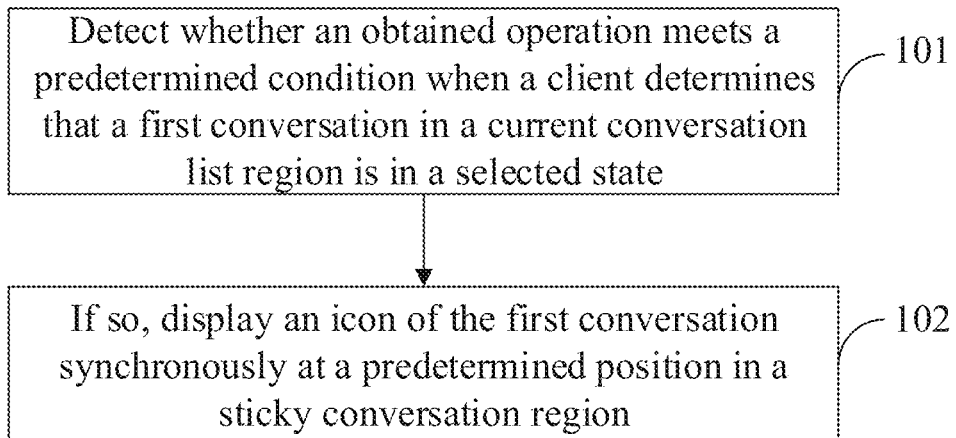
FIG. 1 is a flowchart illustrating a method for sticking a conversation message on top for processing according to an embodiment of the present disclosure.

The embodiments of the present disclosure will be described in detail below with reference to examples thereof as illustrated in the accompanying drawings, throughout which same or similar elements, or elements having same or similar functions, are denoted by same or similar reference numerals. The embodiments described below with reference to the drawings are illustrative only, and are intended to explain, rather than limiting, the present disclosure.

A method and apparatus for sticking a conversation message on top for processing according to the embodiments of the present disclosure will be described below with reference to the figures.

FIG. 1 is a flowchart illustrating a method for sticking a conversation message on top for processing according to an embodiment of the present disclosure.

As illustrated in FIG. 1, the method for sticking the conversation message on top for processing includes the following steps.

At step 101, when a client determines that a first conversation in a current conversation list region is in a selected state, it is detected whether an obtained operation meets a predetermined condition.

The client may be an instant messaging application, and conversations may be displayed in a form of a list in the conversation list region. A conversation list may be displayed in a reverse chronological order based on receiving time of the latest message in each conversation, or may be displayed in a predetermined order based on, for example, a number of messages in each conversation, a degree of activity of each conversation, etc., and this embodiment is not limited to any of these examples.

A user performs an operation on the first conversation in the conversation list region to select the first conversation, such as selecting the first conversation by clicking, or touching the first conversation with a finger, etc. When determining that the first conversation is in the selected state, the client detects whether the obtained operation meets the predetermined condition.

The predetermined condition may be, for example, a sticky conversation option in a conversation processing menu being selected, an end position the first conversation is dragged to being located in a sticky conversation region, and so on.

For example, the conversation processing menu may include the sticky conversation option, a mark completion option, etc. When the first conversation is in the selected option, it may be detected whether the sticky conversation option in the currently displayed conversation processing menu is selected. As another example, if the client detects a dragging operation of dragging the first conversation in the conversation list region, it may be detected whether an end position of the dragging operation is located in the sticky conversation region.

At step 102, if so, an icon of the first conversation is displayed synchronously at a predetermined position in a sticky conversation region.

In a case where the first conversation in the conversation list region is in the selected state, if it is detected that the obtained operation meets the predetermined condition, e.g., by determining whether the sticky conversation option in the currently displayed conversation processing menu is selected, or whether the end position of the dragging operation on the first conversation is located in the sticky conversation region, the icon of the first conversation is displayed synchronously at the predetermined position in the sticky conversation region.

For example, the first conversation may be displayed at a position adjacent to a position of the latest sticky conversation in the sticky conversation region. As another example, it may be set that at most three icons of conversations may be displayed in each line of the sticky conversation region, such that icons of sticky conversations may be displayed at predetermined positions in the sticky conversation region line by line from top to bottom.

In an embodiment, while the first conversation is being displayed in the sticky conversation region in a form of an icon, the first conversation is also being displayed in the conversation list region, which not only allows the user to process conversation messages based on icons in the sticky conversation region, but also improves flexibility in displaying conversations, thereby facilitating the user's operations.

In the related art, sticky conversations are usually displayed in a form of a list. In an embodiment of the present disclosure, displaying an icon of a sticky conversation in the sticky conversation region may not only facilitate finding a conversation quickly based on its icon by the user, but also save space on an interface. When there may be a number of sticky conversations, more conversations may be displayed on an interface of a certain size with the method according to this embodiment.

In an embodiment of the present disclosure, before displaying the icon of the first conversation synchronously at the predetermined position in the sticky conversation region, the predetermined position may be determined as follows.

As a possible implementation, icons of sticky conversations can be displayed in the sticky conversation region in sequence based on display positions and time of being stuck on top of the sticky conversations. In this case, when the first conversation is displayed in the sticky conversation region, a display position of the icon of the first conversation may be determined based on a display position of each conversation in the current sticky conversation region. For example, a position of a predetermined size on a right side of the latest sticky conversation in the sticky conversation region can be determined as the predetermined position.

As another possible implementation, a conversation in the conversation list region can be dragged to the sticky conversation region through a dragging operation for sticking the conversation on top. Specifically, an end position of the dragging operation obtained may be determined as a predetermined position to display the icon of the first conversation at the predetermined position in the sticky conversation region.

In order to improve flexibility of displaying a sticky conversation, in an embodiment, a display position of a conversation in the sticky conversation region can be adjusted by a dragging operation. The following description will be given with reference to FIG. 2, which is a flowchart illustrating a method for sticking a conversation message on top for processing according to another embodiment of the present disclosure.

Figure 2:
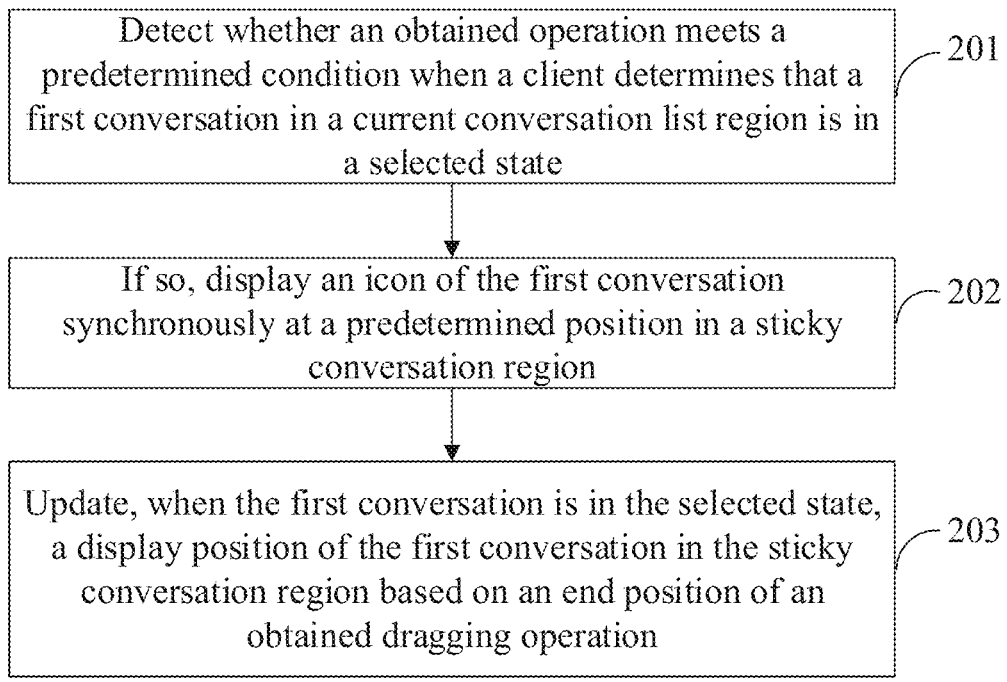
FIG. 2 is a flowchart illustrating a method for sticking a conversation message on top for processing according to another embodiment of the present disclosure.

As illustrated in FIG. 2, the method for sticking the conversation message on top for processing includes the following steps.

At step 201, when a client determines that a first conversation in a current conversation list region is in a selected state, it is detected whether an obtained operation meets a predetermined condition.

At step 202, if so, an icon of the first conversation is displayed synchronously at a predetermined position in a sticky conversation region.

In this embodiment, steps 201-202 are similar to the above steps 101-102, and thus the description thereof will be omitted here.

At step 203, when the first conversation is in the selected state, a display position of the first conversation in the sticky conversation region is updated based on an end position of an obtained dragging operation.

The user can perform a selection operation at the display position of the first conversation, such as clicking a mouse or performing a touch operation at a position on a touch screen corresponding to the first conversation, and drag the first conversation to another position in the sticky conversation region. Then, when the first conversation is in the selected state, the end position of the obtained dragging operation may be used as a new display position of the first conversation. Thus, the first conversation can be displayed at the end position of the dragging operation, such that the display position of the first conversation in sticky conversation region can be updated.

With the method for sticking the conversation message on top for processing according to the embodiment of the present disclosure, the user can adjust the display position of each conversation in the sticky conversation region through the dragging operation, which not only meets personalized needs of the user, but also improves flexibility in displaying each conversation in the sticky conversation region.

When there are a number of conversations in the sticky conversation region, if only icons of the conversations are displayed in the sticky conversation region, it is not convenient for the user to find the conversation he/she is looking for. In an embodiment, an abbreviation of a name of each conversation, such as an abbreviation of a group name, may also be displayed in the sticky conversation region. The following description will be given with reference to FIG. 3, which is a flowchart illustrating a method for sticking a conversation message on top for processing according to yet another embodiment of the present disclosure.

Figure 3:
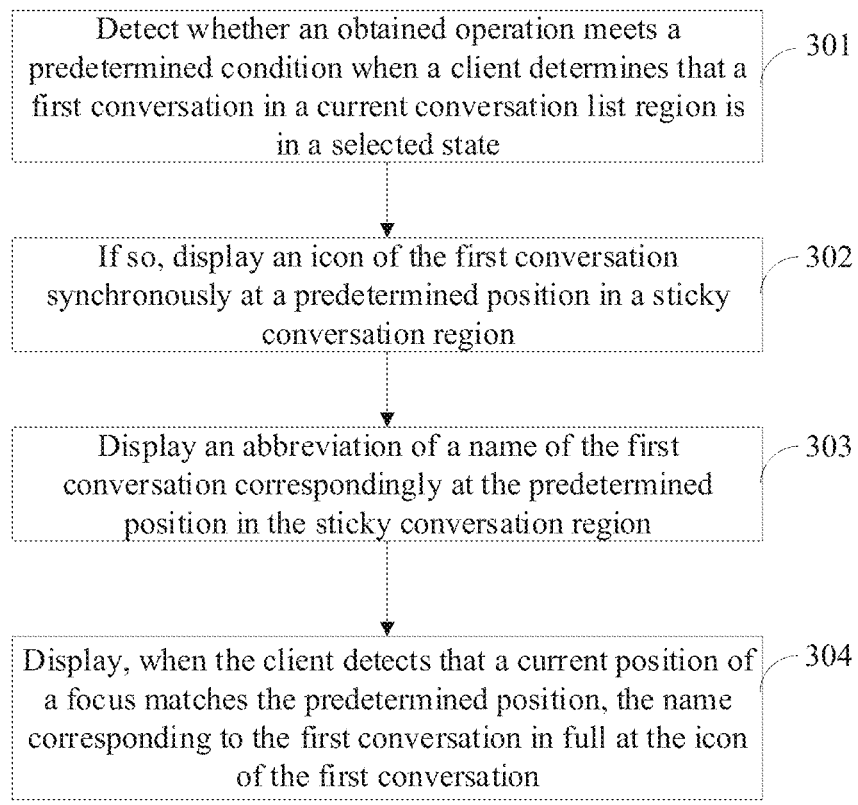
FIG. 3 is a flowchart illustrating a method for sticking a conversation message on top for processing according to yet another embodiment of the present disclosure.

As illustrated in FIG. 3, the method for sticking the conversation message on top for processing includes the following steps.

At step 301, when a client determines that a first conversation in a current conversation list region is in a selected state, it is detected whether an obtained operation meets a predetermined condition.

At step 302, if so, an icon of the first conversation is displayed synchronously at a predetermined position in a sticky conversation region.

In this embodiment, steps 301-302 are similar to the above steps 101-102, and thus the description thereof will be omitted here.

At step 303, an abbreviation of a name of the first conversation is displayed correspondingly at the predetermined position in the sticky conversation region.

After the icon of the first conversation is displayed synchronously at the predetermined position in the sticky conversation region, the abbreviation of the name of the first conversation may be displayed correspondingly at the predetermined position in the sticky conversation region. For example, the abbreviation of the name of the first conversation may be displayed right below the icon of the first conversation. For another example, a name of a sender of the conversation message of the first conversation may be displayed below the icon of the first conversation.

In an embodiment of the present disclosure, by simultaneously displaying an icon and an abbreviation of a name of a sticky conversation in the sticky conversation region, the user can quickly find the conversation in the sticky conversation region based on the icon and the abbreviation of the name of the conversation.

In practical applications, through an abbreviation of a name of a conversation, it may not be easy for the user to identify whether it is the conversation he/she is looking for. Further, after the abbreviation of the name of the first conversation is displayed correspondingly at the predetermined position in the sticky conversation region, the method as illustrated in FIG. 3 further includes step 304, at which the name corresponding to the first conversation can be displayed in full at the icon of the first conversation when the client detects that a current position of a focus matches the predetermined position.

For example, when the user puts the mouse on a display position of a conversation in the sticky conversation region, or touches the display position of the conversation, a full name corresponding to the conversation may be displayed at the icon of the conversation in a floating manner. When the user moves the mouse to another position, the full name of the conversation displayed in the floating manner may disappear.

In an embodiment of the present disclosure, when the client detects that the position of the focus is at a display position of a conversation in the sticky conversation region, the full name of the conversation can be displayed at the icon of the conversation, so that it is convenient for the user to learn the name of the conversation, and the efficiency in processing conversation messages can be improved.

Figure 4:
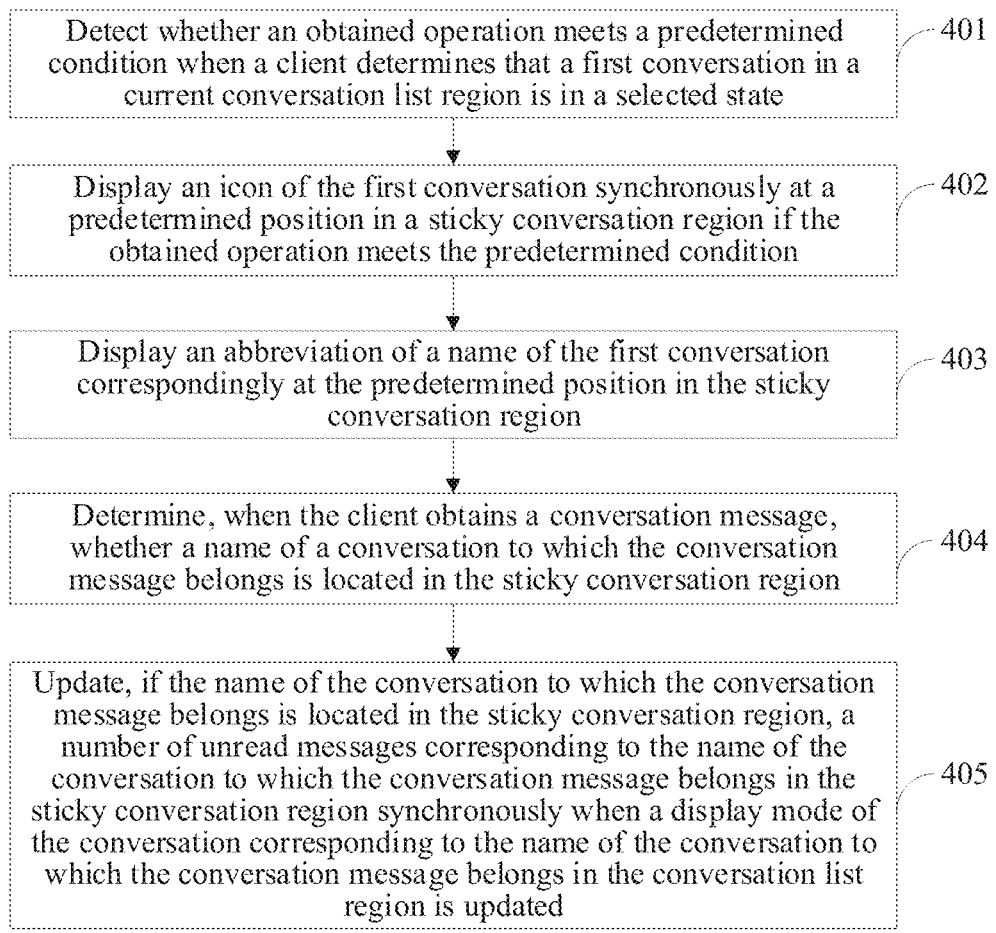
FIG. 4 is a flowchart illustrating a method for sticking a conversation message on top for processing according to still yet another embodiment of the present disclosure.

In practical applications, the client may continuously receive new conversation messages after being activated. In an embodiment of the present disclosure, a conversation may be updated according to a method illustrated in FIG. 4. FIG. 4 is a flowchart illustrating a method for sticking a conversation message on top for processing according to still yet another embodiment of the present disclosure.

As illustrated in FIG. 4, the method for sticking the conversation message on top for processing includes the following steps.

At step 401, when a client determines that a first conversation in a current conversation list region is in a selected state, it is detected whether an obtained operation meets a predetermined condition.

At step 402, if the obtained operation meets the predetermined condition, an icon of the first conversation is displayed synchronously at a predetermined position in a sticky conversation region.

In this embodiment, steps 401-402 are similar to the above steps 101-102, and thus the description thereof will be omitted here.

At step 403, an abbreviation of a name of the first conversation is displayed correspondingly at the predetermined position in the sticky conversation region.

After the icon of the first conversation is displayed synchronously at the predetermined position in the sticky conversation region, the abbreviation of the name of the first conversation may be displayed correspondingly at the predetermined position in the sticky conversation region. For example, the abbreviation of the name of the conversation may be displayed right below the icon of the conversation.

At step 404, when the client obtains a conversation message, it is determined whether a name of a conversation to which the conversation message belongs is located in the sticky conversation region.

When the client is running, new conversation messages may be continuously received. Each conversation message may carry a user identifier of a sender of the conversation message, sending time, and so on.

When the client obtains a conversation message, a name of a conversation to which the conversation message belongs can be determined based on a user identifier of a sender who sent the conversation message, and then it can be determined whether the name of the conversation to which the conversation message belongs is in the sticky conversation region based on the name of the conversation to which the conversation message belongs. That is, when the client obtains the conversation message, it is determined whether the conversation to which the conversation message belongs is located in the sticky conversation region based on the name of the conversation to which the conversation message belongs.

At step 405, if the name of the conversation to which the conversation message belongs is located in the sticky conversation region, a number of unread messages corresponding to the name of the conversation to which the conversation message belongs in the sticky conversation region can be synchronously updated when a display mode of the conversation corresponding to the name of the conversation to which the conversation message belongs in the conversation list region is updated.

Since any conversation in the sticky conversation region is displayed synchronously in the conversation list region, if a name of a conversation to which a conversation message obtained belongs is located in the sticky conversation region, the conversation to which the conversation message belongs in the conversation list region and the conversation to which the conversation message belongs in the sticky conversation region can be updated synchronously.

Specifically, when the display mode of the conversation corresponding to the name of the conversation to which the conversation message belongs in the conversation list region is updated, e.g., when display content, a number of unread messages, etc., are updated, the number of unread messages corresponding to the name of the conversation to which the conversation message belongs in the sticky conversation region can be synchronously updated. A numeral can be used to identify the number of unread messages. The numeral can be displayed at a defined position of an icon of a second conversation, such as an upper right portion.

For example, if a number of unread messages corresponding to a name of a conversation in the sticky conversation region is ten, when a new conversation message for the conversation is received, display content of the conversation in the conversation list region can be updated to content of the new conversation message, and the number of unread messages corresponding to the conversation in the sticky conversation region can be updated to eleven.

In an embodiment of the present disclosure, when the client receives a conversation message, if a name of a conversation to which the conversation message belongs is located in the sticky conversation region, synchronously updating a display mode of the conversation to which the conversation message belongs in the conversation list region and a number of unread messages corresponding to the conversation in the sticky conversation region may ensure synchronized updating of information of the same conversation in the conversation list region and the sticky conversation region. Moreover, the number of unread messages can be displayed on each conversation in the sticky conversation region, such that the user can be aware of the situation of unprocessed conversation messages.

In an embodiment of the present disclosure, after the icon of the first conversation is displayed synchronously at the predetermined position in the sticky conversation region, the client may receive an ordinary conversation message in the first conversation. The ordinary conversation message refers to an ordinary message sent by another party. The first conversation may be a personal conversation or a group conversation.

After a conversation message belonging to the first conversation is obtained, it can be determined whether the conversation message is an ordinary conversation message, for example, it can be determined whether the conversation message contains a special character such as "@". If not, it is determined that the current conversation message is an ordinary conversation message. When the ordinary conversation message is obtained in the first conversation, the display mode, such as the display content, the number of unread messages, etc., of the conversation corresponding to the name of the first conversation in the conversation list region can be updated, and the number of unread messages corresponding to the ordinary conversation message can be displayed in the icon of the first conversation in the sticky conversation region. For example, an icon "P" may be used in the icon of the first conversation to represent the ordinary conversation message, and the number of unread ordinary messages may be displayed on the icon.

In an embodiment of the present disclosure, after the icon of the first conversation is displayed synchronously at the predetermined position in the sticky conversation region, when the ordinary conversation message is obtained in the first conversation, synchronously updating the display mode of the conversation corresponding to the name of the first conversation in the conversation list region and the number of unread messages corresponding to the ordinary conversation message displayed in the icon of the first conversation in the sticky conversation region can not only ensure synchronized updating of conversation information of the same conversation in the conversation list region and the sticky conversation region, but also enable the user to be aware of the situation of unprocessed ordinary conversation messages from the number of unread messages corresponding to the ordinary conversation message displayed in the icon of each conversation in the sticky conversation region.

Figure 11:
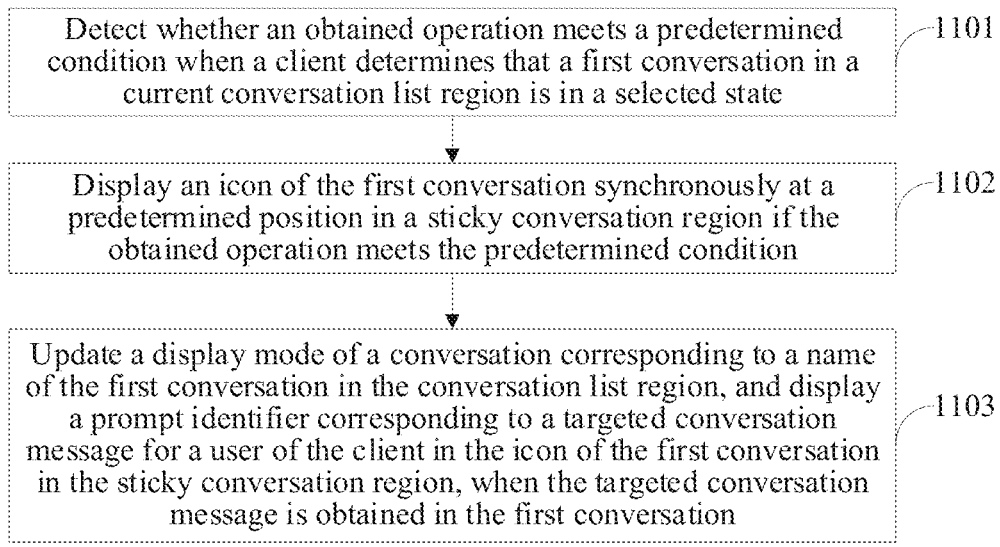
FIG. 11 is a flowchart illustrating a method for sticking a conversation message on top for processing according to an embodiment of the present disclosure.

In practical applications, a targeted message may be sent to a certain person or a certain group member in a group conversation, for example, a targeted message may be sent to a certain person by entering a special character "@". FIG. 11 is a flowchart illustrating a method for sticking a conversation message on top for processing according to an embodiment of the present disclosure As illustrated in FIG. 11, the method for sticking the conversation message on top for processing includes the following steps. At step 1101, when a client determines that a first conversation in a current conversation list region is in a selected state, it is detected whether an obtained operation meets a predetermined condition. At step 1102, if the obtained operation meets the predetermined condition, an icon of the first conversation is displayed synchronously at a predetermined position in a sticky conversation region. In this embodiment, steps 1101-1102 are similar to the above steps 101-102, and thus the description thereof will be omitted here. At step 1103, in order to improve efficiency in processing targeted conversation messages by the user, after the icon of the first conversation is displayed synchronously at the predetermined position in the sticky conversation region, when the targeted conversation message for the user of the client is obtained in the first conversation, the display mode of the conversation corresponding to the name of the first conversation in the conversation list region can be updated, e.g., when the display content, the number of unread messages, etc., are updated, and a prompt identifier corresponding to the targeted conversation message can be displayed in the icon of the first conversation in the sticky conversation region.

A targeted conversation message refers to a message in the conversation message that specifies a user to process the message, and the prompt identifier may be an identifier, such as "@", used to indicate the targeted conversation message.

In addition, when it is determined whether the first conversation contains a targeted message for the user of the client, it may be determined whether the message contains an identifier for indicating a targeted message. For example, when a conversation message contains the character "@", immediately followed by a name of the user of the client, the conversation message can be considered to be a targeted conversation message for the user of the client.

In an embodiment of the present disclosure, after the icon of the first conversation is displayed synchronously at the predetermined position in the sticky conversation region, when the targeted conversation message for the user of the client is obtained in the first conversation, the display mode of the conversation corresponding to the name of the first conversation in the conversation list region can be updated, and the prompt identifier corresponding to the targeted conversation message can be displayed in the icon of the first conversation in the sticky conversation region. In this way, when the targeted conversation message is received, not only the conversation list is updated synchronously, but also the sticky conversation region is updated. In addition, the user can be notified that there is a targeted message to be processed through the prompt identifier, such that efficiency in processing messages can be improved.

In an embodiment of the present disclosure, after a user sends a message to another user, he/she may not receive a response from the other user for a period of time. In this case, the user sending the message can perform an urgent operation to remind the other user to deal with the message quickly. The urgent operation can include inputting a special character, e.g., inputting "*" or "#", etc., or clicking an urgent operation button on a conversation interface. In this way, the other user can receive an urgent conversation message. In order to improve efficiency in processing urgent conversation messages by the other user, an urgency identifier and an icon prompting state may be displayed in the sticky conversation region.

Figure 12:
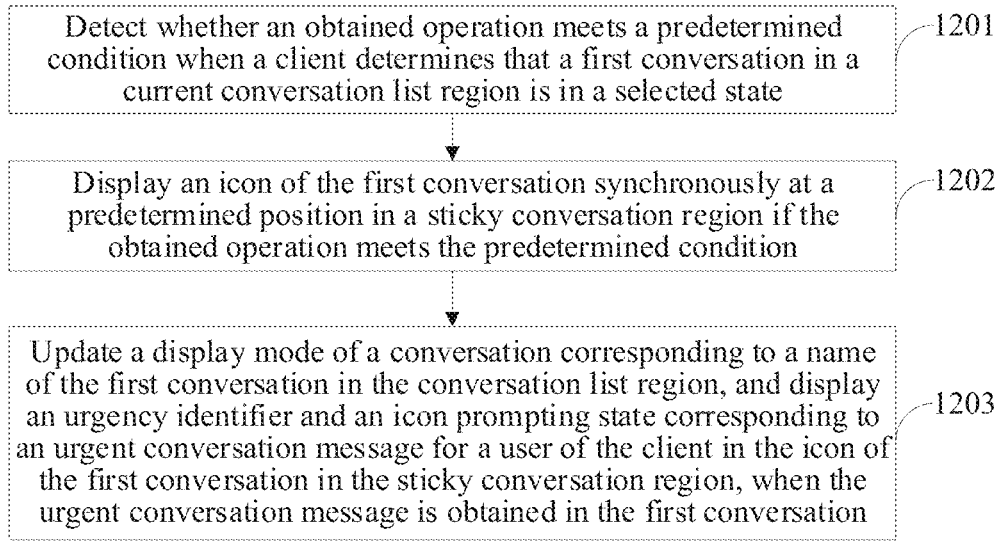
FIG. 12 is a flowchart illustrating a method for sticking a conversation message on top for processing according to an embodiment of the present disclosure.

FIG. 12 is a flowchart illustrating a method for sticking a conversation message on top for processing according to an embodiment of the present disclosure As illustrated in FIG. 12, the method for sticking the conversation message on top for processing includes the following steps. At step 1201, when a client determines that a first conversation in a current conversation list region is in a selected state, it is detected whether an obtained operation meets a predetermined condition. At step 1202, if the obtained operation meets the predetermined condition, an icon of the first conversation is displayed synchronously at a predetermined position in a sticky conversation region. In this embodiment, steps 1201-1202 are similar to the above steps 101-102, and thus the description thereof will be omitted here. At step 1203, when an urgent conversation message for the user of the client is obtained in the first conversation, a display mode of a conversation corresponding to a name of the first conversation in the conversation list region can be updated, e.g., display content, a number of unread messages of the conversation, etc., may be updated, and an urgency identifier and an icon prompting state corresponding to the urgent conversation message can be displayed in the icon of the first conversation in the sticky conversation region. For example, the icon of the first conversation can be displayed in a flickering manner when an urgency icon is displayed. The first conversation may be a personal conversation or a group conversation, and the urgency identifier may be set as desired.

In an embodiment of the present disclosure, after the icon of the first conversation is displayed synchronously at the predetermined position in the sticky conversation region, when the urgent conversation message for the user of the client is obtained in the first conversation, the display mode of the conversation corresponding to the name of the first conversation in the conversation list region can be updated, and the urgency identifier and the icon prompting state corresponding to the urgent conversation message can be displayed in the icon of the first conversation in the sticky conversation region. In this way, when the urgent conversation message is obtained in the first conversation, not only the conversation list is updated synchronously, but also the sticky conversation region is updated. In addition, the user can be reminded that there is an urgent message to be processed by displaying the urgency identifier and the icon prompting state, such that efficiency in processing messages can be improved.

Figure 5:
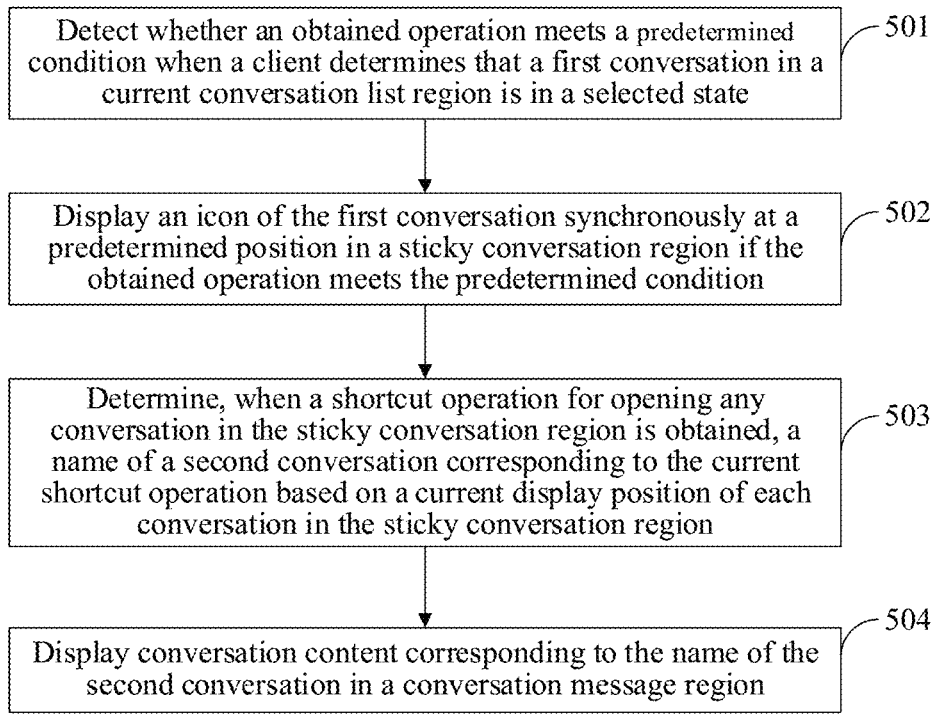
FIG. 5 is a flowchart illustrating a method for sticking a conversation message on top for processing according to still yet another embodiment of the present disclosure.

In practical applications, a conversation in the sticky conversation region can be opened by a mouse click or touch operation, but such operations are relatively troublesome and will affect efficiency in processing conversation messages. In an embodiment of the present disclosure, any conversation in the sticky conversation region may be opened through a shortcut operation, which is described below with reference to FIG. 5. FIG. 5 is a flowchart illustrating a method for sticking a conversation message on top for processing according to still yet another embodiment of the present disclosure.

As illustrated in FIG. 5, the method for sticking the conversation message on top for processing includes the following steps.

At step 501, when a client determines that a first conversation in a current conversation list region is in a selected state, it is detected whether an obtained operation meets a predetermined condition.

At step 502, if the obtained operation meets the predetermined condition, an icon of the first conversation is displayed synchronously at a predetermined position in a sticky conversation region.

In this embodiment, steps 501-502 are similar to the above steps 101-102, and thus the description thereof will be omitted here.

At step 503, when a shortcut operation for opening any conversation in the sticky conversation region is obtained, a name of a second conversation corresponding to the current shortcut operation is determined based on a current display position of each conversation in the sticky conversation region. In this embodiment, any conversation in the sticky conversation region can be opened through the shortcut operation. Specifically, when obtaining an operation by the user, the client can analyze the operation. When it is determined that the operation is the shortcut operation for opening any conversation in the sticky conversation region, a display position of the second conversation corresponding to the shortcut operation can be determined based on the current display position of each conversation in the sticky conversation region, and then the name of the second conversation can be determined.

As an example, the shortcut operation for opening any conversation in the sticky conversation region can be set as "Ctrl+display position of conversation". Here the display position of the conversation can be represented by a numeral. When the shortcut operation for opening any conversation in the sticky conversation region is obtained, a conversation corresponding to the numeral in the shortcut operation may be found from the sticky conversation region based on the numeral indicating the display position of the conversation in the shortcut operation and the current display position of each conversation in the sticky conversation region. The name of the conversation is the name of the second conversation corresponding to the shortcut operation.

For example, a keyboard shortcut "Ctrl+1" may open the first conversation in the sticky conversation region, a keyboard shortcut "Ctrl+2" may open the second conversation in the sticky conversation region, and a keyboard shortcut "Ctrl+3" may open the third conversation in the sticky conversation region, and so on.

At step 504, conversation content corresponding to the name of the second conversation is displayed in a conversation message region.

After the name of the second conversation corresponding to the shortcut operation is determined, the conversation content corresponding to the name of the second conversation can be displayed in the conversation message region, so that the user can process conversations in the conversation message region.

Figure 6:
FIG. 6 is a first schematic diagram showing a display interface of a client according to an embodiment of the present disclosure.
Figure 7:
FIG. 7 is a second schematic diagram showing a display interface of a client according to an embodiment of the present disclosure.

Reference is now made to FIG. 6 and FIG. 7. FIG. 6 is a first schematic diagram showing a display interface of a client according to an embodiment of the present disclosure. FIG. 7 is a second schematic diagram showing a display interface of a client according to an embodiment of the present disclosure.

In FIG. 6, the conversation message region is shown on a right side of the display interface, and the sticky conversation region is shown as a region marked with a box on an upper left part of the display interface. The sticky conversation region includes icons of two sticky conversations. The second conversation in the sticky conversation region can be opened by a keyboard shortcut "Ctrl+2". As illustrated in FIG. 6, the second conversation is displayed in the conversation message region, and the second conversation is in the selected state in the conversation list region.

In addition, the user clicks a "Quick Jump" button in the sticky conversation region in FIG. 6, or uses a shortcut operation "Ctrl+k" to open a jump entry. The jump entry pops up on an interface of the client, as illustrated in FIG. 7. In FIG. 7, a jump list is displayed below the jump entry. In addition to directly searching for a conversation to be opened in the jump entry, an important conversation can be displayed in the jump list with a high priority. The user can select a conversation to open from the jump list.

In an embodiment of the present disclosure, when the client obtains the shortcut operation for opening any conversation in the sticky conversation region, the client can quickly open a corresponding conversation based on the current display position of each conversation in the sticky conversation region, thereby improving efficiency in processing conversation messages by the user.

Figure 8:
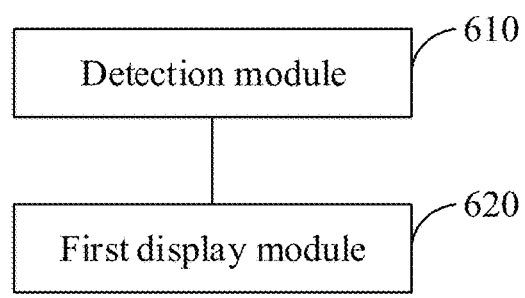
FIG. 8 is a block diagram showing a structure of an apparatus for sticking a conversation message on top for processing according to an embodiment of the present disclosure.

To implement the above embodiments, an embodiment of the present disclosure further provides an apparatus for sticking a conversation message on top for processing. FIG. 8 is a block diagram showing a structure of an apparatus for sticking a conversation message on top for processing according to an embodiment of the present disclosure.

As illustrated in FIG. 8, the apparatus for sticking the conversation message on top for processing includes a detection module 610 and a first display module 620.

The detection module 610 is configured to detect whether an obtained operation meets a predetermined condition when a client determines that a first conversation in a current conversation list region is in a selected state.

The first display module 620 is configured to display an icon of the first conversation synchronously at a predetermined position in a sticky conversation region when the obtained operation meets the predetermined condition.

In an embodiment of the present disclosure, the detection module 610 can be configured to detect whether a sticky conversation option in a conversation processing menu currently displayed is selected; or, detect whether an end position of a dragging operation obtained currently is located in the sticky conversation region.

In an embodiment of the present disclosure, the apparatus can further include a first determining module and a second determining module. The first determining module is configured to determine the predetermined position based on a current display position of each conversation in the sticky conversation region. The second determining module is configured to determine the predetermined position based on the end position of the obtained dragging operation.

In an embodiment of the present disclosure, the apparatus can further include a first updating module. The first updating module is configured to update, when the first conversation is in the selected state, a display position of the first conversation in the sticky conversation region based on an end position of an obtained dragging operation.

In an embodiment of the present disclosure, the first display module 620 can be further configured to display an abbreviation of a name of the first conversation correspondingly at the predetermined position in the sticky conversation region.

In an embodiment of the present disclosure, the apparatus can further include a second updating module. The second updating module is configured to update a display mode of a conversation corresponding to a name of the first conversation in the conversation list region, and to display a number of unread messages corresponding to an ordinary conversation message in the icon of the first conversation in the sticky conversation region, when the ordinary conversation message is obtained in the first conversation.

In an embodiment of the present disclosure, the apparatus can further include a third updating module. The third updating module is configured to update a display mode of a conversation corresponding to a name of the first conversation in the conversation list region, and to display a prompt identifier corresponding to a targeted conversation message in the icon of the first conversation in the sticky conversation region, when the targeted conversation message for a user of the client is obtained in the first conversation.

In an embodiment of the present disclosure, the apparatus can further include a fourth updating module. The fourth updating module is configured to update a display mode of a conversation corresponding to a name of the first conversation in the conversation list region, and to display an urgency identifier and an icon prompting state corresponding to an urgent conversation message in the icon of the first conversation in the sticky conversation region, when the urgent conversation message for a user of the client is obtained in the first conversation.

In an embodiment of the present disclosure, the first display module 620 can be further configured to display, when the client detects that a current position of a focus matches the predetermined position, the name corresponding to the first conversation in full at the icon of the first conversation.

In an embodiment of the present disclosure, the apparatus can further include a determining module and a second display module. The determining module is configured to determine, when a shortcut operation for opening any conversation in the sticky conversation region is obtained, a name of a second conversation corresponding to the current shortcut operation based on the current display position of each conversation in the sticky conversation region. The second display module is configured to display conversation content corresponding to the name of the second conversation in a conversation message region.

It is to be noted that the above description of the embodiments of the method for sticking the conversation message on top for processing is also applicable to the apparatus for sticking the conversation message on top for processing according to the embodiment, and thus details thereof will be omitted here.

With the apparatus for sticking the conversation message on top for processing according to the embodiment of the present disclosure, when a client determines that a first conversation in a current conversation list region is in a selected state, it is detected whether an obtained operation meets a predetermined condition. If so, an icon of the first conversation is displayed synchronously at a predetermined position in a sticky conversation region. In this way, an icon of a conversation in a conversation list region can be displayed synchronously in the sticky conversation region through an operation meeting the predetermined condition, such that a user can process a message based on the icon in the sticky conversation region. In this way, the processing efficiency can be improved, and by displaying the conversation simultaneously in the conversation list region and the sticky conversation region, flexibility in displaying the conversation can be improved, thereby facilitating the user's operations.

To implement the above embodiments, an embodiment of the present disclosure further provides an electronic device. The electronic device includes a processor and a memory. The processor executes a program corresponding to executable program codes by reading the executable program codes stored in the memory, to perform the method for sticking the conversation message on top for processing as described in the above embodiments.

Figure 9:
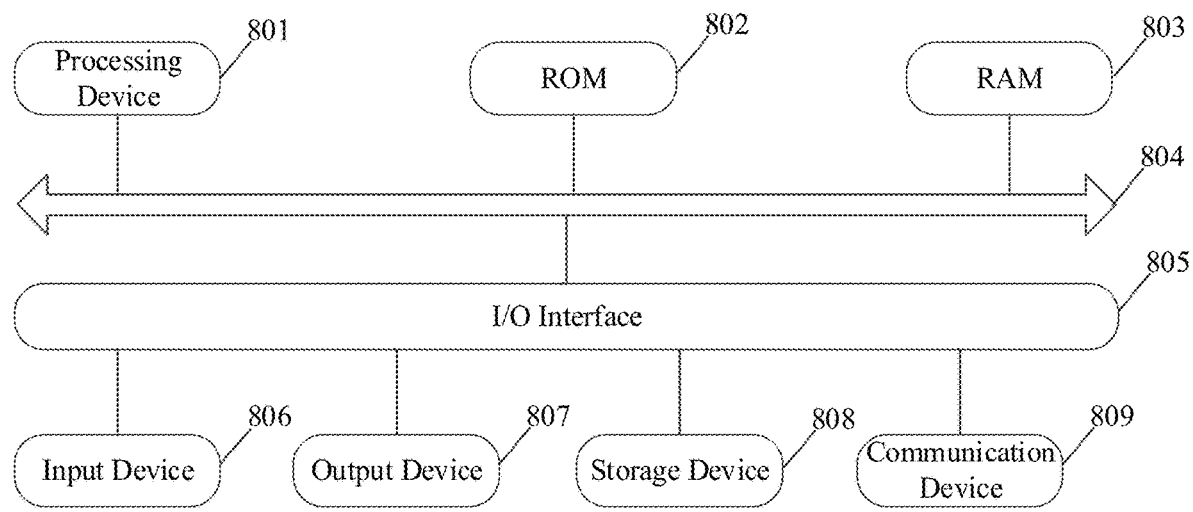
FIG. 9 is a block diagram showing a structure of an electronic device suitable for implementing an embodiment of the present disclosure.

Reference is now made to FIG. 9, which is a block diagram showing a structure of an electronic device suitable for implementing an embodiment of the present disclosure. A terminal device according to the embodiment of the present disclosure may include, but not limited to, a mobile terminal such as a mobile phone, a laptop computer, a digital broadcast receiver, a Personal Digital Assistant (PDA), a tablet computer or PAD, a Portable Multimedia Player (PMP), or a vehicle-mounted terminal (e.g., a vehicle-mounted navigation terminal), or a fixed terminal such as a digital TV, a desktop computer, etc. The electronic device illustrated in FIG. 9 is exemplary only, and should not be construed as limiting the function and scope of use of the embodiments of the present disclosure.

As illustrated in FIG. 9, the electronic device may include a processing device (such as a central processing unit, a graphics processing unit, etc.) 801, which may perform various appropriate actions and processes in accordance with programs stored in a Read Only Memory (ROM) 802 or loaded from a storage device 808 into a Random Access Memory (RAM) 803. In the RAM 803, various programs and data required for operation of the electronic device may also be stored. The processing device 801, the ROM 802, and the RAM 803 are connected to each other through a bus 804. An Input/Output (I/O) interface 805 is also connected to the bus 804.

Generally, the following devices may be connected to the I/O interface 805: an input device 806 including, for example, a touch screen, a touch pad, a keyboard, a mouse, a camera, a microphone, an accelerometer, a gyroscope, etc.; an output device 807 including, for example, a Liquid Crystal Display (LCD), a speaker, an oscillator, etc.; the storage device 808 including, for example, a magnetic tape or a hard disk; and a communication device 809. The communication device 809 may allow the electronic device to perform wireless or wired communication with other devices for data exchange. Although FIG. 9 illustrates the electronic device having various devices, it can be appreciated that it is not necessary to implement or provide all the illustrated devices. Alternatively, more or fewer devices may be implemented or provided.

In particular, according to an embodiment of the present disclosure, the processes described above with reference to the flowcharts may be implemented as computer software programs. For example, an embodiment of the present disclosure includes a computer program product, which includes a computer program carried on a computer-readable medium. The computer program includes program codes for implementing the method illustrated in any of the flowcharts. In these embodiments, the computer program may be downloaded and installed from a network through the communication device 809, or installed from the storage device 808, or installed from the ROM 802. When the computer program is executed by the processing device 801, the above-mentioned functions defined in the methods according to the embodiments of the present disclosure are performed.

It is to be noted that the above computer-readable medium in the present disclosure may be a computer-readable signal medium or a computer-readable storage medium or any combination thereof. The computer-readable storage medium may be, but not limited to, for example, an electrical, magnetic, optical, electromagnetic, infrared, or semiconductor system, apparatus, or device, or any combination thereof. More specific examples of the computer-readable storage medium may include, but not limited to: an electrical connection having one or more wires, a portable computer disk, a hard disk, a Random Access Memory (RAM), a Read Only Memory (ROM), an Erasable Programmable Read Only Memory (EPROM) or a flash memory, an optical fiber, a Compact Disc Read-Only Memory (CD-ROM), an optical memory device, a magnetic memory device, or any suitable combination thereof. In the present disclosure, the computer-readable storage medium may be any tangible medium including or storing programs, which may be used by or used with an instruction execution system, apparatus, or device. However, in the present disclosure, the computer-readable signal medium may include a data signal propagated in a baseband or as a part of a carrier that carries computer-readable program codes. Such propagated data signal may be in various forms, including but not limited to an electromagnetic signal, an optical signal, or any suitable combination thereof. The computer-readable signal medium may be any computer-readable medium other than the computer-readable storage medium, which may transmit, propagate, or transfer programs used by or used with an instruction execution system, apparatus or device. The program codes contained on the computer-readable medium may be transmitted via any appropriate medium, including but not limited to electric cable, optical cable, Radio Frequency (RF), or any suitable combination thereof.

The above computer-readable medium may be included in the above electronic device; or may be standalone without being assembled into the electronic device.

The above computer-readable medium may carry one or more programs which, when executed by the electronic device, cause the electronic device to: obtain at least two Internet Protocol addresses; send a node assessment request including the at least two Internet Protocol addresses to a node assessment device, in which the node assessment device selects an Internet Protocol address from the at least two Internet Protocol addresses and returns the Internet Protocol address; and receive the Internet Protocol address returned by the node assessment device. Each of the obtained Internet Protocol address indicates an edge node in a content distribution network.

Alternatively, the above computer-readable medium may carry one or more programs which, when executed by the electronic device, cause the electronic device to: obtain at least two Internet Protocol addresses; send a node assessment request including the at least two Internet Protocol addresses to a node assessment device, in which the node assessment device selects an Internet Protocol address from the at least two Internet Protocol addresses and returns the Internet Protocol address; and receive the Internet Protocol address returned by the node assessment device. Each of the obtained Internet Protocol address indicates an edge node in a content distribution network.

The computer program codes for implementing the operations according to the embodiments of the present disclosure may be written in one or more programming languages or any combination thereof. The programming languages may include object-oriented programming languages, such as Java, Smalltalk, or C++, as well as conventional procedure-oriented programming languages, such as "C" language or similar programming languages. The program codes may be executed completely on a user computer, partly on the user computer, as a standalone software package, partly on the user computer and partly on a remote computer, or completely on the remote computer or server. In a case where the remote computer is involved, the remote computer may be connected to the user computer through any types of network, including a Local Area Network (LAN) or a Wide Area Network (WAN), or to an external computer (e.g., over the Internet by using an Internet service provider).

The flowcharts and block diagrams in the figures illustrate architectures, functions, and operations of possible implementations of systems, methods, and computer program products according to various embodiments of the present disclosure. In this regard, each block in the flowcharts or block diagrams may represent a module, a program segment, or a part of codes. The module, program segment, or part of codes may contain one or more executable instructions for implementing a specified logical function. It is also to be noted that, in some alternative implementations, functions showed in blocks may occur in a different order from the order shown in the figures. For example, two blocks illustrated in succession may actually be executed substantially in parallel with each other, or sometimes even in a reverse order, depending on functions involved. It is also to be noted that each block in the block diagrams and/or flowcharts, or any combination of the blocks in the block diagrams and/or flowcharts, may be implemented using a dedicated hardware-based system that is configured to perform specified functions or operations or using a combination of dedicated hardware and computer instructions.

Units involved and described in the embodiments of the present disclosure may be implemented in software or hardware. A name of a unit does not constitute a limitation on the unit itself under certain circumstances. For example, a first obtaining unit may also be described as "a unit for obtaining at least two Internet Protocol addresses".

To implement the above embodiments, an embodiment of the present disclosure provides a computer-readable storage medium. The computer-readable storage medium stores a computer program. The computer program, when executed by a processor, implements the method for sticking the conversation message on top for processing as described in the above embodiments.

Figure 10:
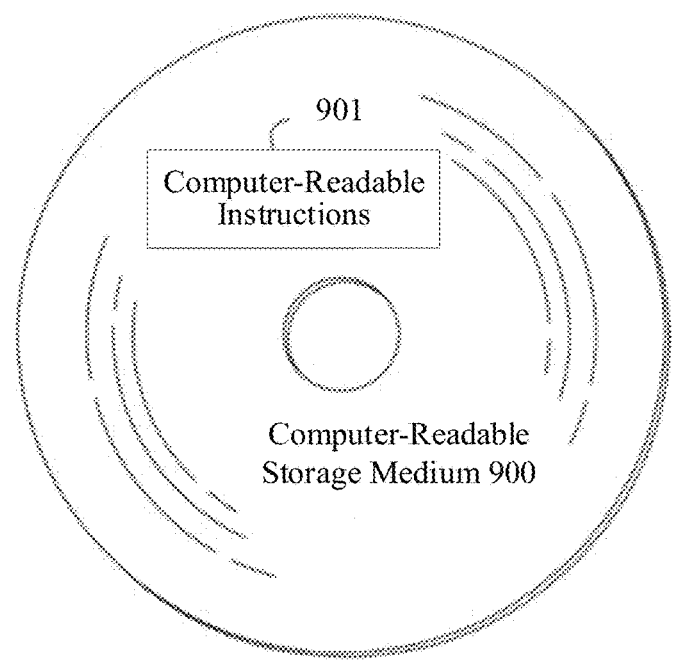
FIG. 10 is a schematic diagram showing a computer-readable storage medium according to an embodiment of the present disclosure.

FIG. 10 is a schematic diagram showing a computer-readable storage medium according to an embodiment of the present disclosure. As illustrated in FIG. 10, a computer-readable storage medium 900 according to the embodiment of the present disclosure has computer-readable instructions 901 stored thereon. The computer-readable instructions 901, when executed by a processor, implements all or part of the steps of the method for sticking the conversation message on top for processing according to the above embodiments of the present disclosure.

In the description of the present disclosure, the terms "first" and "second" are only used for the purpose of description, and should not be construed as indicating or implying any relative importance or implicitly indicating the number of defined technical features. Therefore, the features defined with "first" and "second" may explicitly or implicitly include at least one of the features. In the description of the present disclosure, "a plurality of" means at least two, e.g., two, three, etc., unless specifically defined otherwise.

Although the embodiments of the present disclosure have been shown and described above, it can be appreciated that the above embodiments are exemplary only, and should not be construed as limiting the present disclosure. Various changes, modifications, replacements and variants can be made to the above embodiments by those skilled in the art without departing from the scope of the present disclosure.

What is claimed is:

1. A method for sticking a conversation message at a portion of a window of an application for processing, the method comprising:

detecting whether an obtained operation meets a predetermined condition when a client determines that a first conversation in a current conversation list region of the window of the application is in a selected state; and when the obtained operation meets the predetermined condition, displaying an icon identifying the first conversation synchronously at a predetermined position in a sticky conversation region of the window of the application, wherein while the icon identifying the first conversation is being displayed in the sticky conversation region of the window of the application, the first conversation is being displayed in the conversation list region of the window of the application, wherein the method further comprises, subsequent to displaying the icon identifying the first conversation synchronously at the predetermined position in the sticky conversation region of the window of the application:

updating a display mode of a conversation corresponding to a name of the first conversation in the conversation list region of the window of the application, and displaying a number of unread messages corresponding to an ordinary conversation message that contains no special character in the icon identifying the first conversation in the sticky conversation region of the window of the application, when the ordinary conversation message that contains no special character is obtained in the first conversation.

2. The method of claim 1, further comprising, subsequent to displaying the icon identifying the first conversation synchronously at the predetermined position in the sticky conversation region of the window of the application:

updating, when the first conversation is in the selected state, a display position of the first conversation in the sticky conversation region of the window of the application based on an end position of an obtained dragging operation.

3. The method of claim 1, further comprising, subsequent to displaying the icon identifying the first conversation synchronously at the predetermined position in the sticky conversation region of the window of the application:

updating a display mode of a conversation corresponding to a name of the first conversation in the conversation list region of the window of the application, and displaying a prompt identifier corresponding to a targeted conversation message for a user of the client in the icon identifying the first conversation in the sticky conversation region of the window of the application, when the targeted conversation message is obtained in the first conversation.

4. The method of claim 1, further comprising, subsequent to synchronously displaying the icon identifying the first conversation at the predetermined position in the sticky conversation region of the window of the application:

updating a display mode of a conversation corresponding to a name of the first conversation in the conversation list region of the window of the application, and displaying an urgency identifier and an icon prompting state corresponding to an urgent conversation message for a user of the client in the icon identifying the first conversation in the sticky conversation region of the window of the application, when the urgent conversation message is obtained in the first conversation.

5. The method of claim 1, further comprising, subsequent to displaying the icon identifying the first conversation synchronously at the predetermined position in the sticky conversation region of the window of the application:

determining, when a shortcut operation for opening any conversation in the sticky conversation region of the window of the application is obtained, a name of a second conversation corresponding to the shortcut operation based on a current display position of each conversation in the sticky conversation region of the window of the application; and displaying conversation content corresponding to the name of the second conversation in a conversation message region of the window of the application.

6. The method of claim 1, wherein detecting whether the obtained operation meets the predetermined condition further comprises:

detecting whether a sticky conversation option in a conversation processing menu currently displayed is selected; or detecting whether an end position of a dragging operation obtained currently is located in the sticky conversation region of the window of the application.

7. The method of claim 6, further comprising, prior to said displaying the icon identifying the first conversation synchronously at the predetermined position in the sticky conversation region of the window of the application:

determining the predetermined position based on a current display position of each conversation in the sticky conversation region of the window of the application; or determining the predetermined position based on the end position of the obtained dragging operation.

8. The method of claim 1, further comprising, subsequent to displaying the icon identifying the first conversation synchronously at the predetermined position in the sticky conversation region of the window of the application:

displaying an abbreviation of a name of the first conversation correspondingly at the predetermined position in the sticky conversation region of the window of the application.

9. The method of claim 8, further comprising, subsequent to displaying the abbreviation of the name of the first conversation correspondingly at the predetermined position in the sticky conversation region of the window of the application:

displaying, when the client detects that a current position of a focus matches the predetermined position, the name corresponding to the first conversation in full at the icon identifying the first conversation.

10. An electronic device, comprising a processor and a memory, wherein the memory stores a program corresponding to executable program codes, which when executed by the processor causes the electronic device to perform a method for sticking a conversation message at a portion of a window of an application for processing comprising:

detecting whether an obtained operation meets a predetermined condition when a client determines that a first conversation in a current conversation list region of the window of the application is in a selected state; and when the obtained operation meets the predetermined condition, displaying an icon identifying the first conversation synchronously at a predetermined position in a sticky conversation region of the window of the application, wherein while the icon identifying the first conversation is being displayed in the sticky conversation region of the window of the application, the first conversation is being displayed in the conversation list region of the window of the application, wherein the method further comprises, subsequent to displaying the icon identifying the first conversation synchronously at the predetermined position in the sticky conversation region of the window of the application:

updating a display mode of a conversation corresponding to a name of the first conversation in the conversation list region of the window of the application, and displaying a number of unread messages corresponding to an ordinary conversation message that contains no special character in the icon identifying the first conversation in the sticky conversation region of the window of the application, when the ordinary conversation message that contains no special character is obtained in the first conversation.

11. A non-transitory computer-readable storage medium having a computer program stored thereon, wherein the program, when executed by a processor, implements a method for sticking a conversation message at a portion of a window of an application for processing comprising:

detecting whether an obtained operation meets a predetermined condition when a client determines that a first conversation in a current conversation list region of the window of the application is in a selected state; and when the obtained operation meets the predetermined condition, displaying an icon identifying the first conversation synchronously at a predetermined position in a sticky conversation region of the window of the application, wherein while the icon identifying the first conversation is being displayed in the sticky conversation region of the window of the application, the first conversation is being displayed in the conversation list region of the window of the application, wherein the method further comprises, subsequent to displaying the icon identifying the first conversation synchronously at the predetermined position in the sticky conversation region of the window of the application:

updating a display mode of a conversation corresponding to a name of the first conversation in the conversation list region of the window of the application, and displaying a number of unread messages corresponding to an ordinary conversation message that contains no special character in the icon identifying the first conversation in the sticky conversation region of the window of the application, when the ordinary conversation message that contains no special character is obtained in the first conversation.

* * * * *